United States Patent [19]
Larchevesque

[11] Patent Number: 5,696,363
[45] Date of Patent: Dec. 9, 1997

[54] ELECTRONIC COMPONENT INCLUDING A SWITCH THAT IS MOVABLE IN TRANSLATION

[75] Inventor: Alain Larchevesque, Ferolles, France

[73] Assignee: Solaic, Puteaux, France

[21] Appl. No.: 653,313

[22] Filed: May 24, 1996

[30] Foreign Application Priority Data

Jun. 14, 1995 [FR] France .................. 95 07097

[51] Int. Cl.[6] .................. H01H 15/02; G06K 7/00
[52] U.S. Cl. .................. 200/16 R; 200/16 D; 235/441
[58] Field of Search .................. 200/16 C, 16 D, 200/547–551; 235/435–445, 487–492; 283/83, 904

[56] References Cited

U.S. PATENT DOCUMENTS

| | | | |
|---|---|---|---|
| 4,429,202 | 1/1984 | Tedd et al. | 200/16 R X |
| 4,441,000 | 4/1984 | Suwa | 200/16 R X |
| 4,454,391 | 6/1984 | Olsson | 200/16 D |
| 4,737,602 | 4/1988 | Yamamoto | 200/16 D |
| 4,774,399 | 9/1988 | Fujita et al. | 235/441 |
| 4,797,542 | 1/1989 | Hara | 235/380 |
| 5,016,086 | 5/1991 | Inoue et al. | 235/443 X |
| 5,377,263 | 12/1994 | Bazemore et la. | 379/355 |

FOREIGN PATENT DOCUMENTS

| | | | |
|---|---|---|---|
| 2558291 | 10/1984 | France | G11C 5/00 |

*Primary Examiner*—J. R. Scott
*Attorney, Agent, or Firm*—Griffin, Butler, Whisenhunt & Kurtossy

[57] ABSTRACT

The electronic card of the invention comprises inside a card body, a printed circuit including two spaced-apart electrodes on the bottom of a cavity formed in the card body and having two parallel side faces. A switch actuator is displaceable inside the cavity parallel to the side faces thereof between an active position in which it electrically interconnects the two electrodes and an inactive position in which it leaves the two electrodes electrically isolated from each other. The face of the switch actuator which faces the electrodes has a conductive coating thereon. Complementary stop means are provided by the cavity and the switch actuator.

4 Claims, 1 Drawing Sheet

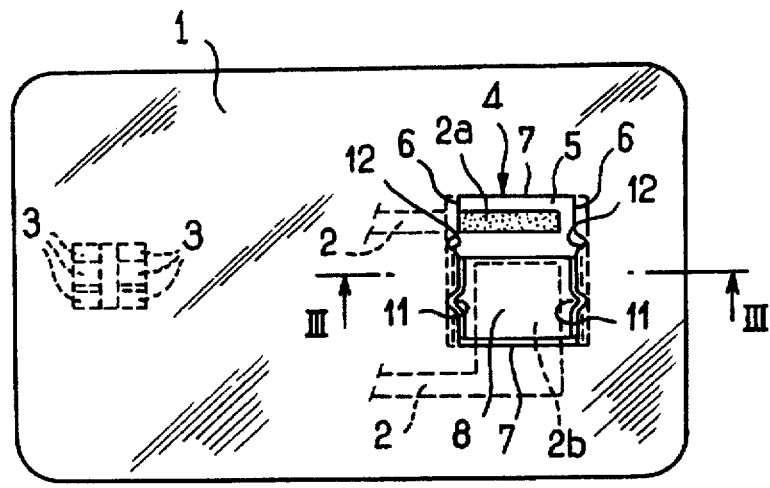
FIG_1
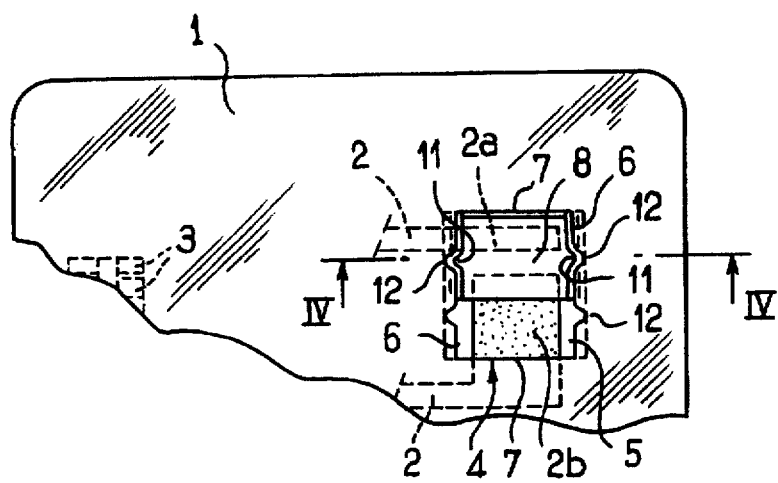
FIG_2
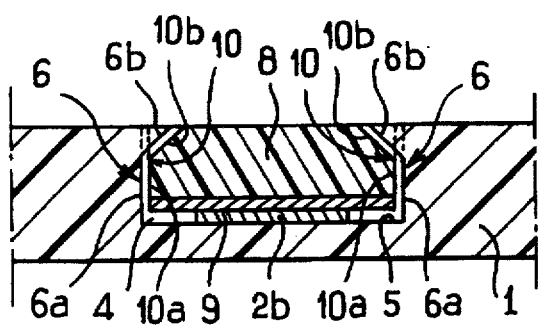
FIG_3
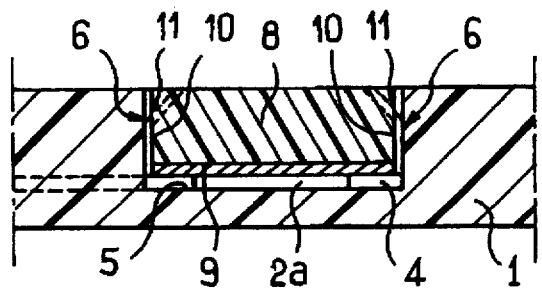
FIG_4

ELECTRONIC COMPONENT INCLUDING A SWITCH THAT IS MOVABLE IN TRANSLATION

The present invention relates to an electronic card including a printed circuit inside a card body.

BACKGROUND OF THE INVENTION

Present-day electronic cards are too thin to be fitted with a switch that does not include any projecting portion, that is transversely displaceable and that is capable of providing the user with information by touch whenever the printed circuit is switched on or off.

OBJECTS AND SUMMARY OF THE INVENTION

The present invention seeks to provide a solution to the above problem, and to do so it provides an electronic card comprising, inside a card body, a printed circuit including two spaced-apart electrodes on the bottom of a cavity formed in the card body and having two parallel side faces, a switch actuator is displaceable inside the cavity parallel to the side faces thereof, between an active position in which it electrically interconnects the two electrodes and an inactive position in which it leaves the two electrodes electrically isolated from each other, the cavity and the switch actuator include complementary stop means comprising two notches formed in one of the two side faces of the cavity and a projection situated on the switch actuator in such a manner as to engage in the notches whenever the switch actuator comes successively into its active position and into its inactive position.

By means of the above dispositions, the switch actuator can be received in the body of the card in such a manner that it does not project therefrom. It can also provide different amounts of mechanical resistance whenever it arrives in its active or inactive positions or whenever it moves away therefrom. The user must overcome this mechanical resistance to move the switch actuator, and therefore knows exactly when the electrical circuit has been switched on or off.

In addition, the active and inactive positions of the switch actuator are stable, thereby eliminating any risk of the electrical circuit being switched on or off in an untimely manner.

In a variant, the complementary stop means could comprise two notches formed in each of the side faces of the cavity, and two projections situated on the switch actuator in such a manner that each of them engages in one of the notches in the same side face of the cavity whenever said switch actuator comes successively into its active position and into its inactive position.

Advantageously, each of the side faces of the cavity includes a first length adjacent to the bottom and the second length overhanging said bottom, the switch actuator including two facing side faces of shapes complementary to those of the side faces of the cavity.

The switch actuator is easily installed since it suffices to insert it by force between the second lengths of the side faces of the cavity, possibly by using a flat tool for enlarging the opening thereto. Any risk of the switch actuator escaping from the cavity in untimely manner is also eliminated, since the second lengths oppose extraction thereof.

The notches are preferably formed in the second length of at least one of the side faces of the cavity, at least one of the side faces of the switch actuator having a projection on its portion facing the second length of the corresponding side face of said cavity.

BRIEF DESCRIPTION OF THE DRAWING

An embodiment of the present invention is described below by way of non-limiting example and with reference to the accompanying drawing, in which:

FIG. 1 is a plan view of an electronic card of the invention, with the switch actuator being shown in its inactive position;

FIG. 2 is a view analogous to FIG. 1, but showing the switch actuator in its active position;

FIG. 3 is a section view on a larger scale on line III—III of FIG. 1; and

FIG. 4 is a section view on a larger scale on line IV—IV of FIG. 2.

MORE DETAILED DESCRIPTION

The electronic card that can be seen in FIGS. 1 and 2 comprises a flat body 1 made of plastics material and containing a printed circuit 2 having one or more functional members of conventional design connected thereto and suitable for being powered by a battery or any other source of electrical energy.

In order to avoid overcrowding the drawing, the functional members and the electricity supply are not shown, since they do not form part of the invention.

The top face of the body 1 is provided in conventional manner with conductive areas 3 designed to connect the printed circuit to an external reader in order to enable data to be interchanged between the reader and the functional members.

The bottom face of the card is provided with a cavity 4 having a rectangular bottom 5, two side faces 6 and two transverse faces 7.

The bottom 5 is parallel to the top and bottom faces of the body 1, while each of the side faces 6 includes a first length 6a that is perpendicular and adjacent to the bottom 5 and a second length 6b that overhangs it. The transverse faces 7 are perpendicular to the bottom 5.

The printed circuit 2 includes two electrodes 2a and 2b situated on the bottom 5 and slightly spaced apart.

A switch actuator 18 made of plastics material is received in the cavity 4. Its face situated adjacent to the bottom 5 is provided with a conductive coating 9, while its face that faces away from the bottom 5 occupies the same plane as the bottom face of the card body 1, as shown in FIGS. 3 and 4.

The switch actuator 8 can be displaced inside the cavity 4 parallel to the side faces 6 thereof between an active position as shown in FIG. 2 where the coating 9 electrically interconnects the electrodes 2a and 2b, and an inactive position shown in FIG. 1 where the coating 9 leaves the electrodes electrically insulated from each other.

The side faces 10 of the switch actuator are complementary in shape to the side faces 6 of the cavity 4. As can be seen in FIGS. 3 and 4, each of them has a first length 10a and a second length 10b that come into contact with the first length 6a and the second length 6b respectively of the corresponding side face 6.

Each of the second lengths 10b of the side faces of the switch carries a projection 11 that is shaped to engage in two notches 12 formed in the length 6b of the corresponding side face 6 whenever the switch is in its active position or its inactive position.

When the user desires to move the switch actuator between its active and inactive positions, predetermined force needs to be applied to extract the projections 11 from the notches 12 in which they are retained, after which a smaller force suffices to move the switch actuator until the projections engage in the other notches 12.

Depending on the amount of force the user needs to apply, he or she is fully aware of the moment that the switch actuator reaches its active position or its inactive position.

In the embodiment shown in the accompanying drawing, the cavity is formed in the bottom face of the card body 1, but there is nothing to prevent it being formed in the top face thereof.

In addition, it would not go beyond the ambit of the present invention if the second length 6b of only one side face 6 of the cavity 4 were to include two notches 12 and the switch actuator were to include only one projection 11 suitable for co-operating with those two notches.

In order to complete the description, it is specified that the lengths 6b of the side faces of the cavity oppose untimely extraction of the switch actuator 8 therefrom.

Finally, it should be observed that by enabling the source of electricity inserted in the card body to be genuinely isolated electrically, the switch actuator avoids leakage currents of the kind that usually appear in printed circuit and functional members when they are switched off, thereby enabling the lifetime of the electronic card to be lengthened by a factor lying in the range 1 to 10.

I claim:

1. An electronic card comprising a card body, a cavity formed in the card body and having a bottom and two parallel side faces, two spaced-apart electrodes on the bottom connecting a printed circuit, a switch actuator displaceable inside the cavity parallel to the side faces thereof between an active position in which it electrically interconnects the two electrodes and an inactive position in which it leaves the two electrodes electrically isolated from each other, an electrical conductive coating on a face of the switch actuator which contacts the said electrode, and complementary stop means carried by the cavity and by the switch actuator, wherein the complementary stop means comprise two notches formed in one of the two side faces of the cavity and a projection situated on the switch actuator in such a manner as to engage in the notches whenever the switch actuator comes successively into its active position and into its inactive position.

2. An electronic card according to claim 1, wherein the complementary stop means comprise two notches formed in each of the side faces of the cavity, and two projections situated on the switch actuator in such a manner that each of them engages in one of the notches in the same side face of the cavity whenever said switch actuator comes successively into its active position and into its inactive position.

3. An electronic card according to claim 1, wherein each of the side faces of the cavity includes a first length adjacent to the bottom and the second length overhanging said bottom, the switch actuator including two facing side faces of shapes complementary to those of the side faces of the cavity.

4. An electronic card according to claim 3, wherein the notches are formed in the second length of at least one of the side faces of the cavity, at least one of the side faces of the switch actuator having a projection from a portion facing the second length of the corresponding side face of said cavity.

* * * * *